United States Patent [19]

Niitti et al.

[11] Patent Number: 4,508,619

[45] Date of Patent: Apr. 2, 1985

[54] PROCEDURE FOR PROVIDING THE VANES OF THE STATOR OF A FLOTATION MACHINE WITH A COVER AND FOR FIXING THE COVER

[75] Inventors: Timo U. Niitti; Alvar M. Niskala, both of Espoo, Finland

[73] Assignee: Outokumpu Oy, Helsinki, Finland

[21] Appl. No.: 496,185

[22] Filed: May 19, 1983

[30] Foreign Application Priority Data

Jun. 3, 1982 [FI] Finland ................................ 821977

[51] Int. Cl.³ ........................ B03D 1/14; B23P 11/02

[52] U.S. Cl. ...................................... 209/169; 29/450; 29/453; 29/156.8 R

[58] Field of Search ................................ 209/168-170; 261/87, 93; 55/435; 29/156.8 B, 458, 156.8 R, 789, 235, 450, 453; 366/264; 415/196, 197, 214; 416/241 A

[56] References Cited

U.S. PATENT DOCUMENTS

| | | | |
|---|---|---|---|
| 2,365,888 | 12/1944 | Linderfelt | 138/96 R |
| 2,373,876 | 4/1945 | Cutler | 29/132 |
| 2,406,532 | 8/1946 | Fahrenwald | 261/87 |
| 3,229,738 | 1/1966 | Bianchini | 138/96 R |
| 3,882,016 | 5/1975 | Green | 261/87 |
| 4,193,949 | 3/1980 | Naito | 261/87 |
| 4,425,232 | 1/1984 | Lawrence et al. | 261/87 |

*Primary Examiner*—Bernard Nozick

*Attorney, Agent, or Firm*—John Smith-Hill

[57] ABSTRACT

The coating on the stator vanes in a flotation machine is subject to abrasive load caused by the air/suspension flow and acting on the top part of the vane facing the rotor. In prior art, the coating placed on the vane was stationarily joined, serving single use only. In the invention a detachable coating (6) has been developed, which is placed like a sock upon the stator vane (4) and secured in place with the aid of a cover member (8). This securing, or locking, is accomplished with the aid of a groove (7) machined in the stator vane and of tooth-like projections (9) provided on the cover member. A locally worn-out coating may be detached and either turned through 180° or inverted and put back in its place.

11 Claims, 4 Drawing Figures

PROCEDURE FOR PROVIDING THE VANES OF THE STATOR OF A FLOTATION MACHINE WITH A COVER AND FOR FIXING THE COVER

The present invention concerns a procedure for fixing detachable and exchangeable lining or cover pieces to the vanes of a flotation machine's stator.

The mixing mechanism of a flotation machine consists of two parts: a rotor rotating on the end of shaft, and stator encircling it. The rotor serves two purposes: (1) to mix the suspension, whereby the solid matter present therein remains in suspended state, and (2) to disperse into small bubbles the air blown through the rotor into the suspension. The stator's task is (1) to prevent the rotary motion of the suspension in the flotation cell, (2) to counteract the abrasive effect on the walls of the tank exerted by the suspension/solid matter/air jets, and (3) to create propitious conditions for the dispersion of air. Since the stator is called upon to dissipate the greater part of the energy used by the rotor towards mixing the suspension containing mineral matter, it is subject to high, but non-uniform abrasive load. In addition, experience has taught that the stator vanes wear down severely in certain areas, whereas in the other areas the wear is moderate only. It has been found that the point most strongly subject to wear on the stator vane is located on its side facing to rotor, in the region of $\frac{1}{8}$–$\frac{1}{4}$ of the vane's height, measured from the top, and less severe wear is encountered in the region $\frac{1}{4}$–$\frac{3}{8}$.

Depending on conditions, the stator vanes wear out to unusable condition within six months to two years. Heretofore, the entire stator had to be replaced even though only a certain fairly limited area had been destroyed, while its remaining parts were still in good condition. The flotation machine's rotor and stator were disposed on the bottom of the flotation tank as separate units so that the rotor could be taken out of the tank by the aid of its shaft, but removal of the stator required the tank to be emptied.

The body of the stator is made of steel which has been provided with a cover of wear-resistant material. Rubber or polyurethane has been used for cover material. The cover has been affixed either by glueing or by hot vulcanizing.

Since the cover on the surface of the stator vanes is only subject to local wear and on this account the entire stator has to be replaced, in this invention a detachable cover has been developed of which the position relative to the stator vane can be changed and thereby an unworn area of the cover placed at the point exposed to wear. In particular, this invention concerns a procedure for affixing the coating to the stator vane.

The invention is more closely described with the aid of the attached figures.

Figure 1:
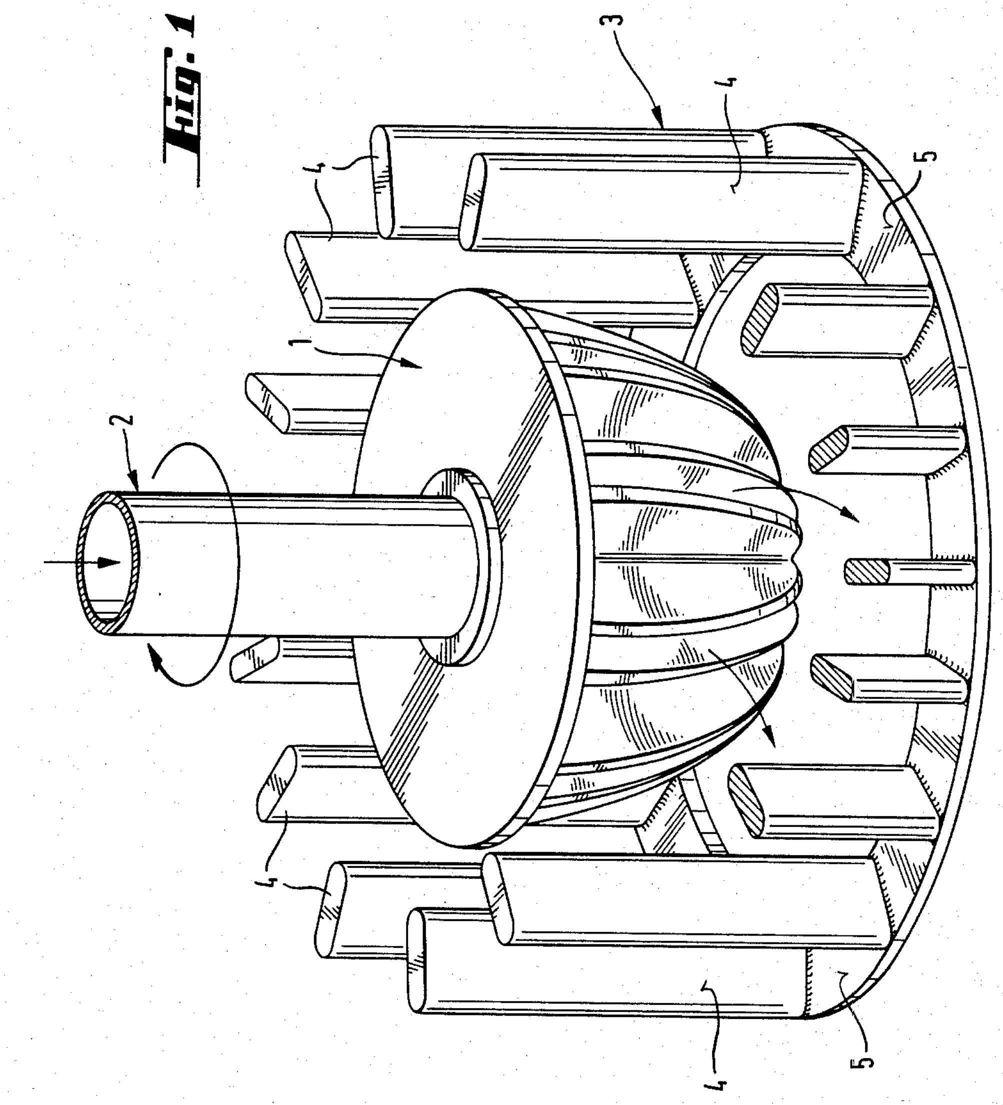
FIG. 1 is an oblique axonometric principle diagram depicting the mixing mechanism of a flotation machine.

In FIG. 1 is presented a schematic diagram of the mixing mechanism of a flotation machine, comprising a rotor 1 with shaft 2 and around the rotor a stator 3, consisting of the stator vanes 4 and of a coated bottom plate 5, on which the stator vanes have been mounted.

Figure 2:
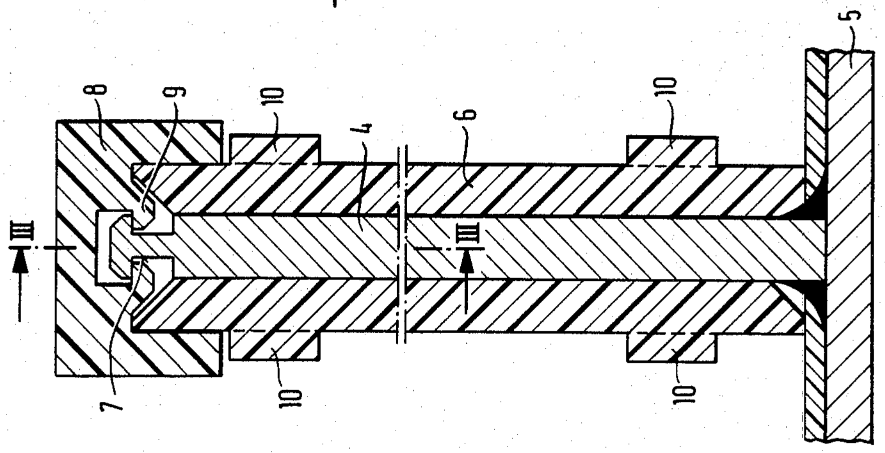
FIG. 2 is a vertical section through a stator vane on its (narrower) side facing the rotor shaft.

FIG. 2 depicts in greater detail the stator vane 4. On the surface of the vane, around it, has been provided a detachable and replaceable cover 6. The coating consists of a sleeve of elastic, wear-resistant material and is fitted like a sock around the stator vane. For the purpose of fixing the cover, a groove 7 has been machined in the top end of the vane 4. The cover 6 is secured in its position upon the vane with a locking member 8 of the same material as the cover and provided with tooth-like projections 9, which are pressed into the groove 7 on the top end of the vane. The locking member urges the cover 6 downward so that the pressure exerted by the upper and lower margin of the cover prevents the access of suspension into the cover 6.

When the cover has been worn down on the side facing the rotor, the coating is detached by removing the locking member 8 with the aid of a special tool. It is also possible, in aid of removing the sleeve or sock, to use the handle members 10 located fixedly on the cover and consisting of the same material. The handle members are integral with the cover. After detaching, the coating can be turned through 180° with reference to the stator vane so that an unworn surface is positioned at the point exposed to wear, that is on the side of the stator vane facing the rotor.

Figure 3:
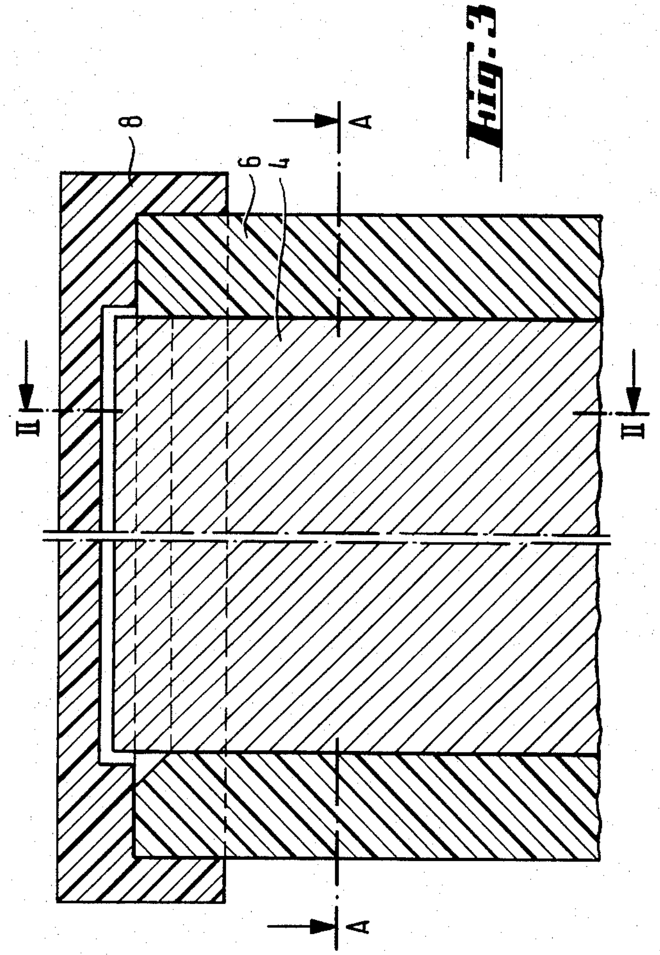
FIG. 3 is a vertical section of the stator vane as viewed from its broader side (the side parallel to the radius of the circle having its centre on the rotor shaft)
Figure 4:
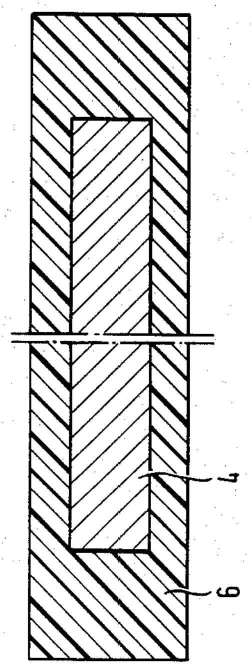
FIG. 4 is a cross section of the stator vane at the point A—A in FIG. 3.

FIG. 3 shows the stator vane viewed from another direction, and FIG. 4 presents the section A—A from FIG. 3. It is seen in FIG. 4 that the cover 6 has been installed in sock fashion upon the stator vane.

The detachable, turnable cover around the stator vane is fit for use through a time which is a multiple of that which can be contemplated in the case of the previous single-use cover affixed with a permanent attachment.

The air/suspension flow impinging on the stator vane from the direction of the rotor exerts its greatest abrasive effect on the stator at the upper part facing the rotor of the stator vane. When the upper part of the cover has been fully utilized in the manner just described, the cover may be inverted 180° and the lower part be used next. If the wear of the cover has been quite local, for instance in the region $\frac{1}{8}$–$\frac{1}{4}$, it is moreover possible to cut the cover in two and to invert the pieces once more 180° so that the areas still intact can be utilized. With the cover pieces thus on top of each other and pressed in place by means of the locking member, a tight enough joint is also accomplished between the lower and upper parts of the cover.

The detachable and replaceable cover and the mode of securing the coating may be applied not only in the case of the stator vanes of a flotation machine but also in suspension mixers and other equivalent equipment where stator plates or vanes of similar type are used.

We claim:

1. A method of providing a stator vane of a flotation machine with a cover secured thereto, comprising placing a removable, sleeve cover member of elastic material over the vane, and securing the cover member to the vane by means of a removable cap locking member which secures cover to vane, whereby the locking member may be removed to permit removal of the cover member from the vane.

2. A method according to claim 1, wherein the locking member is formed with tooth-like projections for engaging substantially complementary grooves in the stator vane.

3. A method according to claim 1, comprising subsequently removing the locking member, removing the cover member from the vane, replacing the cover member on the vane in inverted disposition, and replacing the locking member.

4. A method according to claim 1, comprising subsequently removing the locking member, removing the cover member from the vane, replacing the coating member on the vane with the cover member rotated through 180° about a longitudinal axis of the vane, and replacing the locking member.

5. A method according to claim 1, comprising subsequently removing the locking member, removing the cover member from the vane, cutting the cover member in two in a direction transverse to the length of the cover member, replacing the two cut parts of the cover member on the vane in reverse order with respect to their previous positions on the vane, and replacing the locking member.

6. A method according to claim 1, wherein the elastic material is a material selected from the group consisting of rubber and polyurethane.

7. A method according to claim 1, wherein the locking member is made of an elastic material selected from the group consisting of rubber and polyurethane.

8. A flotation machine having at least one stator vane, and a cover secured to the vane, said cover being formed by a sleeve cover member of elastic material within which the vane extends, and a locking cap member securing the cover member to the vane, said locking cap member being removable to permit removal of the cover member from the vane.

9. A machine according to claim 8, wherein the locking member is formed with tooth-like projections engaging substantially complementary grooves in the stator vane.

10. A machine according to claim 8, comprising a plurality of stator vanes disposed substantially parallel to each other in a circle, each vane having two major sides extending substantially parallel to radii of the circle, and wherein the cover member is provided with handle members on the sides of the cover member which cover the major sides of the vane.

11. A machine according to claim 10, wherein the handle members are integral with the cover member.

* * * * *